UNITED STATES PATENT OFFICE.

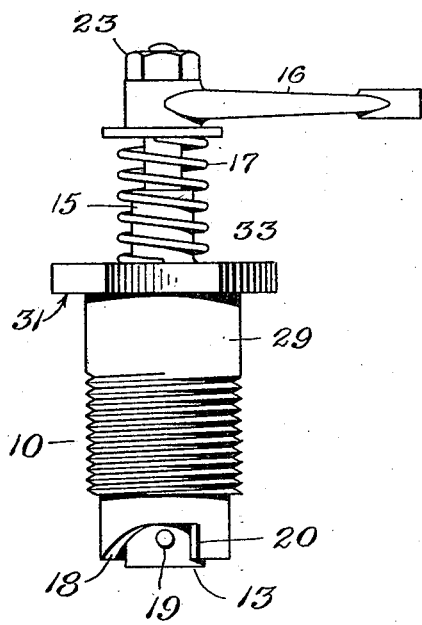
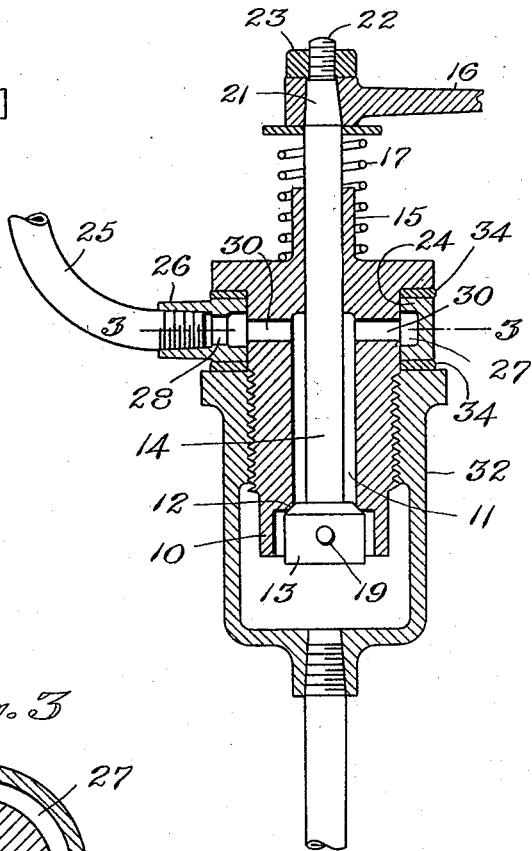
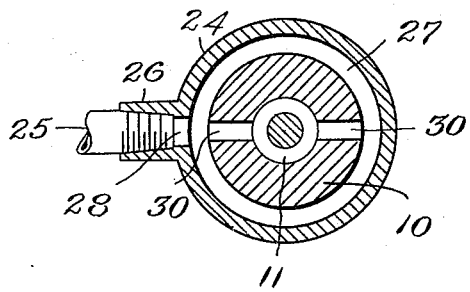

ROLLIN ABELL, OF MILTON, MASSACHUSETTS.

VALVE.

1,132,542.            Specification of Letters Patent.        Patented Mar. 23, 1915.

Application filed January 14, 1913. Serial No. 741,962.

*To all whom it may concern:*

Be it known that I, ROLLIN ABELL, a citizen of the United States, and resident of Milton, in the county of Norfolk and State of Massachusetts, have invented certain new and useful Improvements in Valves, of which the following is a specification.

This invention relates to valves, and one of its objects is to prevent particles of dirt from holding the valve away from its seat so as to permit leaking. The valve is of the puppet type and is capable of rotation, but it opens and closes by axial movement. A limited rotary movement is imparted to the valve for the purpose of grinding such particles of dirt as may become lodged between it and the seat, and the opening movement is imparted in consequence of such rotary movement. The rotary movement which thus indirectly opens the valve first causes a grinding operation, and, when reversed to close the valve, causes a grinding operation after the closing movement.

Another object of the invention is the provision of fittings whereby the valve and a fluid pressure pipe may be quickly attached to a valve casing so as to form a tight joint without an additional opening in the casing for the pipe, the fittings being so made as to utilize the same opening in the valve casing for the pipe connection as for the valve connection.

Of the accompanying drawings which illustrate one form in which the invention may be embodied: Figure 1 represents an elevation of the valve holder with the valve mounted therein, and means for imparting rotary movement to the valve. Fig. 2 represents a section through the mechanism shown by Fig. 1, with the addition of a support for the valve holder and an annular fitting adapted to coöperate with the valve holder. Fig. 3 represents a section in the plane indicated by line 3—3 of Fig. 2.

The same reference characters indicate the same parts wherever they occur.

The valve holder, indicated at 10, is formed with a chamber 11 the mouth 12 of which constitutes a seat for a valve 13. The valve has a stem 14 which bears in a guide 15 formed on the holder. The valve may be formed as an integral part of the stem or as a separate part affixed thereto. The valve and stem are capable of rotary movement and of axial movement. A handle or lever 16 is tightly secured to the stem outside the holder. A helical spring 17 surrounds the stem and is compressed between the holder and the lever 16, so that it is adapted to normally hold the valve against its seat 12. It is obvious that rotary movement imparted to the valve stem by the lever 16 will merely cause the valve to turn on its seat, so far as the mechanism so far described is concerned; but in order to cause the valve to move away from its seat, the holder 10 is provided with a cam surface 18, and the valve is provided with a pin or other projection 19 which is adapted to ride upon the cam surface and thus positively retract the valve from its seat. The holder is provided with a shoulder 20 which is adapted to be engaged by the pin 19 when the valve is closed, this shoulder serving as a stop for limiting the rotary movement of the valve. There is a considerable distance between the stop shoulder 20 and that point of the cam 18 where the pin 19 first engages the cam, which space determines the extent of grinding movement which the valve member has on its seat before it is retracted therefrom. In this embodiment of the invention the cam surface 18 is formed at one end of the holder 10 where it may be formed with greatest facility because it may be so readily reached.

In order to provide for angular adjustment of the lever 16, the outer end of the valve stem is formed with a frusto-conical portion 21, and the hole through the lever is tapered so that the valve stem may be wedged tightly into the lever. A screwthreaded shank or extension 22 of the valve stem is provided with a nut 23 whereby the lever may be forced tightly upon the portion 21.

The valve holder is designed to be used in conjunction with an annular member 24 in order to facilitate the formation of a tight joint between the valve chamber 11 and a pipe 25. The annular member 24 is here shown as having a nipple 26 for the reception of the pipe. An annular groove 27 is formed in the member 24, and a port 28 forms communication between the pipe and this groove. The annular member is intended to be loosely fitted upon the valve holder, and for this purpose the valve holder is provided with a cylindric portion 29. Ports 30 extending through the wall of the valve holder form communication between the chamber 11 and the annular groove 27. By means of the connection just described, a passageway is provided for conducting fluid from the pipe 25 into the chamber 11, and vice versa, regardless of the circumferential position which the annular member 24 occupies with relation to the holder 10.

The holder is provided with a seat or shoulder 31 for determining the axial relation of the holder and annular member 24 so that the ports 30 will register with the groove 27. The holder, as shown by Fig. 2, is inserted in a support 32 which may be a part of a valve casing. The holder is externally threaded and the support is internally threaded to form the desired connection whereby the holder may be screwed into the support and thus confine the annular member 24 tightly between the seat 31 and the confronting surface of the support. The holder 10 is provided with angular faces 33 adapted to receive a wrench for tightening the holder in the support. Gaskets are indicated in Fig. 2 at 34, one of these gaskets being placed between the annular member 24 and the seat 31, and the other being placed between the member 24 and the support 32.

The valve and its holder, together with the operating mechanism, are self-contained and are removable as a unit from the support 32. Screwing the valve holder tightly into the support 32 tightens the joint of the pipe 25. When the valve holder is sufficiently tightened, the actuating lever 16 may be set at the desired angular position and the device is ready for use.

I claim:

1. A device of the character described, comprising a rotary valve and seat therefor, means for limiting rotary movement in one direction of said valve, said valve having a stem with a frusto-conical portion, an operating member mounted upon said frusto-conical portion, and means for causing said operating member to coact frictionally with said frusto-conical portion, whereby said valve may be adjusted to the limit of its rotary movement and said operating member adjusted rotatively with relation to said valve while said operating member and frusto-conical portions are coactively engaged with each other.

2. The combination with a valve casing having an internally threaded opening, of an externally threaded plug adapted to be screwed into said opening, said plug having a chamber with an opening at the inner end of the plug for communication with the interior of the casing, an annular member adapted to fit around said plug outside the casing, said plug having a smooth cylindric surface for engagement with said annular member and a flange for confining the annular member against the casing, said annular member having an internal annular groove and a port communicating therewith, said plug having a port forming communication between said chamber and groove, and a valve member coöperating with said plug to control communication between said chamber and the interior of the valve casing.

3. A device of the character described comprising inner and outer screw-threaded members one of which is adapted to be screwed into the other, an annular member surrounding said inner member, said inner member having a flange for confining said annular member against the outer member, and a smooth cylindric surface for engaging the internal surface of the annular member, said annular member having an internal annular groove and a conduit communicating therewith, said inner member having a chamber and a port forming communication between the same and said groove, and a valve member carried by said inner member for coöperating therewith to close said chamber.

4. A device of the character described comprising a valve holder, a valve member, said holder having a seat for said valve member and a portion surrounding said valve member and seat, a spring for holding the valve member against said seat, and means secured to said valve member for rotating the same, said valve member having a radial projection and said surrounding portion having a cam surface for coöperating with said projection to move the valve member bodily away from its seat in consequence of rotary movement of the valve member.

5. A device of the character described comprising a casing having an internally threaded mouth, a plug member havng an external screw-thread for coöperatively engaging the thread in said mouth, an annular member surrounding said plug member outside said casing, said plug member having a chamber for communication with the interior of said casing, and a valve for controlling such communication, said plug member having a seat for said valve, and means overlapping said annular member for forcing the latter against said casing, said plug member and annular member having complemental close-fitting cylindric surfaces, one of said members having an annular groove in its cylindric surface, said plug member having a port forming communication between said chamber and said groove, and said annular member having a port communicating with said groove.

6. A device of the character described, comprising a rotary valve and seat therefor, means for limiting rotary movement in one direction of said valve, said valve having a stem, an operating member mounted upon said stem, and means for causing frictional coaction between said stem and operating member whereby said valve may be adjusted to the limit of its rotary movement and said operating member may be adjusted rotatively with relation to said valve while frictionally coacting with said stem.

In testimony whereof I have affixed my signature, in presence of two witnesses.

ROLLIN ABELL.

Witnesses:
 WALTER C. KNIGHT,
 FRED H. LANGILLE.